United States Patent [19]

Glaser et al.

[11] 4,202,037
[45] May 6, 1980

[54] COMPUTER MICROSCOPE APPARATUS AND METHOD FOR SUPERIMPOSING AN ELECTRONICALLY-PRODUCED IMAGE FROM THE COMPUTER MEMORY UPON THE IMAGE IN THE MICROSCOPE'S FIELD OF VIEW

[76] Inventors: Edmund M. Glaser, 2411 Brambleton Rd., Baltimore, Md. 21209; Hendrik Van der Loos, 26 chemin de Bellevue, 1005 Lausanne, Switzerland

[21] Appl. No.: 895,709

[22] Filed: Apr. 12, 1978

[30] Foreign Application Priority Data

Apr. 22, 1977 [CH] Switzerland .......................... 5080/77

[51] Int. Cl.$^2$ ...................... G06F 15/42; G06M 3/14; H01J 39/12
[52] U.S. Cl. .................................... 364/518; 364/525; 356/39
[58] Field of Search ............... 364/413, 518, 525, 559; 356/39; 250/201, 202; 128/2 A

[56] References Cited

U.S. PATENT DOCUMENTS

| | | | |
|---|---|---|---|
| 3,670,153 | 6/1972 | Rempert et al. | 364/468 |
| 3,729,129 | 4/1973 | Fletcher et al. | 364/518 X |
| 3,819,913 | 6/1974 | Carter et al. | 235/92 PC |
| 3,833,796 | 9/1974 | Fetner | 364/413 |
| 3,932,733 | 1/1976 | Olsen et al. | 364/525 X |
| 3,970,841 | 7/1976 | Green | 356/39 X |
| 4,000,417 | 12/1976 | Adkisson et al. | 356/39 X |
| 4,012,634 | 3/1977 | Bouton et al. | 364/525 X |
| 4,093,991 | 6/1978 | Christie, Jr. et al. | 364/525 |
| 4,097,845 | 6/1978 | Bacus | 356/39 X |

OTHER PUBLICATIONS

"A Semi-Automatic Computer-Microscope for the Analysis of Neuronal Morphology", by E. M. Glaser et al., IEEE Transactions on Bio-Medical Engineering, vol. BME-12, No. 1, Jan. 1965, pp. 22-31.
"A Computer System for the Measurement of Cell and Nuclear Sizes", by W. M. Cowan et al., Journal of Microscopy, vol. 99, Pt. 3, Dec. 1973, pp. 331-348.
"Semiautomatic Tracking of Neuronal Processes", by P. D. Coleman et al., Computer Analysis of Neuronal Structures, R. D. Lindsey, Ed., Plenum Press, N.Y. 1977, pp. 91-109.
The Minicomputer as a Microscope Accessory, P. J. R. Boyle & D. G. Whitlock, Proceedings of the 12th Annual Rocky Mountain Bioengineering Symposium & the 12th International ISA Biomedical Sciences Instrumentation Symposium, Denver, Colo., pp. 79-83, (Apr. 28-30, 1975).

*Primary Examiner*—Edward J. Wise
*Attorney, Agent, or Firm*—Leonard Bloom

[57] ABSTRACT

A computer is coupled to a suitable light microscope in a closed-loop feedback system which facilitates total intervention by the operator. A graphics display electronically produces an image having two components: one, an image of the data stored in the computer's memory; and two, a set of programmed procedures and instructions available to the operator for manipulating the microscope via the computer. The graphics display is juxtaposed to, and optically aligned with, a beam splitter incorporated in the microscope. As a result, the electronically-produced image of the graphics display is superimposed pictorially upon the optical image of a preparation carried on the slide mounted in the microscope's stage. Suitable means are provided to facilitate operator control and intervention. In one embodiment, this means comprises a graphics tablet, interfaced with the computer, and provided with a hand-held stylus. Using the stylus, the operator may selectively exercise command functions, enter selected data from the preparation, and retrieve data previously stored in the computer's memory, while simultaneously looking into the oculars of the microscope. In response to operator commands, the stage of the microscope is servo controlled by the computer in any desired coordinate system. In addition, a sensor is connected between the microscope and the computer for maintaining the constant magnification ratio that facilitates a continuous superposition of the graphics display image upon the preparation image. As a result, the computer microscope of the present invention constitutes a valuable research tool having flexibility and maximum utility at a relatively modest investment.

29 Claims, 11 Drawing Figures

COMPUTER MICROSCOPE APPARATUS AND METHOD FOR SUPERIMPOSING AN ELECTRONICALLY-PRODUCED IMAGE FROM THE COMPUTER MEMORY UPON THE IMAGE IN THE MICROSCOPE'S FIELD OF VIEW

BACKGROUND OF THE INVENTION

In the prior art of long standing, microscopic examinations and analyses have been performed traditionally in the biomedical, metallurgical and other research areas. Of more recent vintage, these microscopic analyses have been automated by means of some type of computerized system.

For example, a semi-automatic computer-microscope has been employed for the analysis of neuronal morphology, namely, for computing and drawing chordal approximations of a basal dendrite system. The computation is performed by means of conventional electronic analog techniques, and the chordal distances are computed according to the Pythagorean theorem by means of squaring, summing and square rooting. The inputs to the computer section of the instrument are linear-motion transducers fixed to the stage of the microscope along the three coordinate axes. There are two output devices: one, a digital printer, which prints on paper tape the distance measurements in micra; and two, a plotting board on which is drawn a two-dimensional projection of the neuron.

In another example, intended for chromosome analysis, a high-magnification microscope has been fitted with a camera lucida (or optical beam splitter) juxtaposed to, and aligned with, a graphics tablet. This arrangement superimposes an image of the graphics tablet upon the image of the preparation. The operator then uses a hand-held stylus to trace and enter selected pictorial data into the memory of a computer.

These semi-automated systems are intended primarily for computation, tracing and data recordation; and while some degree of operator control is provided, the microscope's imaging system provides no information feedback from the computer to the operator. Thus, the operator has no readily available means to compare and selectively investigate the present data (or preparation) in its visual relationship to the data stored in the computer's memory, nor to readily control the microscope via the computer.

As a further development in the prior art, highly automated computerized systems have been developed for very specific biomedical purposes in clinical applications. For example, a scanning automated microscope system has been disclosed for performing leukocyte counts and red blood cell morphology studies. This microscope system has an automatic stage control device, operating along X, Y and Z axes, plus an automated cell-finding processor. The cells are located automatically along a conventional meander search pattern, are centered in the field of view, and are focused automatically. The cells can then be observed either through a color television monitor or through the oculars of the microscope. This system is essentially a clinical laboratory instrument intended to be used by technicians or semi-professionals working in conjunction with pathologists. Operator input is facilitated by means of a keyboard—requiring the operator to look away from the microscope—and there is no electronically-produced image from a graphics display which is optically superimposed upon the visual image of the preparation in the microscope.

Another example is a "flying spot" scanner system intended for automated dendrite tracking. The major components of this system are a microscope, a digital computer, and an image dissector. The image dissector converts the optical density information of the microscope into analog electrical signals suitable for input to the analog-to-digital converter of the computer. There are two optical paths from the respective eyepieces of the microscope, one to the image dissector, and the other to an oscilloscope via a lens and mirror arrangement. The computer drives respective stepping motors to move the microscope along X, Y and Z axes. A joy stick and "button box" facilitate operator interaction with the computer, as the operator views a back-projected image of the microscope field on a projection oscilloscope. In order to select a cell whose dendrites are to be measured, the operator uses the joy stick to move the microscope stage via the computer and stepping motors; and at the same time, the operator may alter focus by means of the button box, which via the computer, actuates a fine-focus stepping motor subsystem. While that degree of operator interaction is provided, nevertheless, this automated system lacks the facility for total operator intervention, while looking into the microscope and viewing the preparation under optimum optical conditions. With the prior art system, the operator must look at a back-projected image of the preparation, and hence there is a loss of resolution resulting in an image of reduced quality. In addition, the back-projected image requires very high levels of illumination intensity, which tend to bleach certain preparations (particularly some fluorescent dyes). This bleaching action is very detrimental in microscope examinations. Moreover, the described prior art system does not provide an on-line graphic display of the data being acquired; it provides the graphics display of the preparation being examined only at the completion of the automatic data-acquisition phase of the program. Even then, only the pictorial component is made available to the operator on the graphics display.

These automated computerized microscope systems utilize the computer to assist in or to replace the tedious manual manipulations inherent in certain analyses performed with a microscope. The whole thrust of these rather sophisticated developments is to minimize the degree of operator intervention, reduce operator time and hence lower the operating costs, and yet improve the accuracy and reliability of measurement and data collection. As a result, these automated systems are primarily intended to be used by technicians for very specific well-defined purposes, and these systems are not well suited for use by research scientists in investigations requiring a high degree of interaction between the operator and the system. This high degree of interaction is desirable in order to preserve operating flexibility and to take advantage of human judgment in controlling data acquisition.

SUMMARY OF THE INVENTION

The apparatus of the present invention comprises, in combination, computer means including memory means for storing data, microscope means for viewing a preparation on a slide therein, means connected between the computer means and the microscope means for simultaneously superimposing a pictorial image of the stored data upon the image of the preparation being viewed by the operator, the superimposed pictorial image including a set of programmed procedures and instructions available to the operator, and further means activated by the operator while continuing to view the preparation in the microscope for simultaneously controlling the microscope via the computer and for selectively adding new data to the stored data, the new data being derived from the particular preparation.

In a corollary aspect of the present invention, a method is disclosed for making a computerized microscopic analysis and data recordation, which comprises the steps of viewing an object by means of a microscope, producing an image which includes system commands plus selected data from a computer memory, optically superimposing that produced image upon the image of the object visible in the microscope's field of view, providing an operator interface with the computer, viewing the pictorial superposition of images, and without a diversion of the operator's eyes away from the microscope's field of view, simultaneously and selectively controlling the microscope via the computer, entering new data derived from the object into the computer memory, and retrieving data from the computer memory.

In another corollary aspect of the present invention, the computerized microscope has a superimposed pictorial display seen by the operator directly in the microscope's field, which superimposed pictorial display comprises a first area in which a visual image of an object in the microscope is superimposed upon an electronically-produced image of data retrieved from a computer's memory, and a second area for providing system control, which second area remains constant despite changes in the superimposed images in the first area.

DETAILED DESCRIPTION

Figures 1, 5A, 5B:
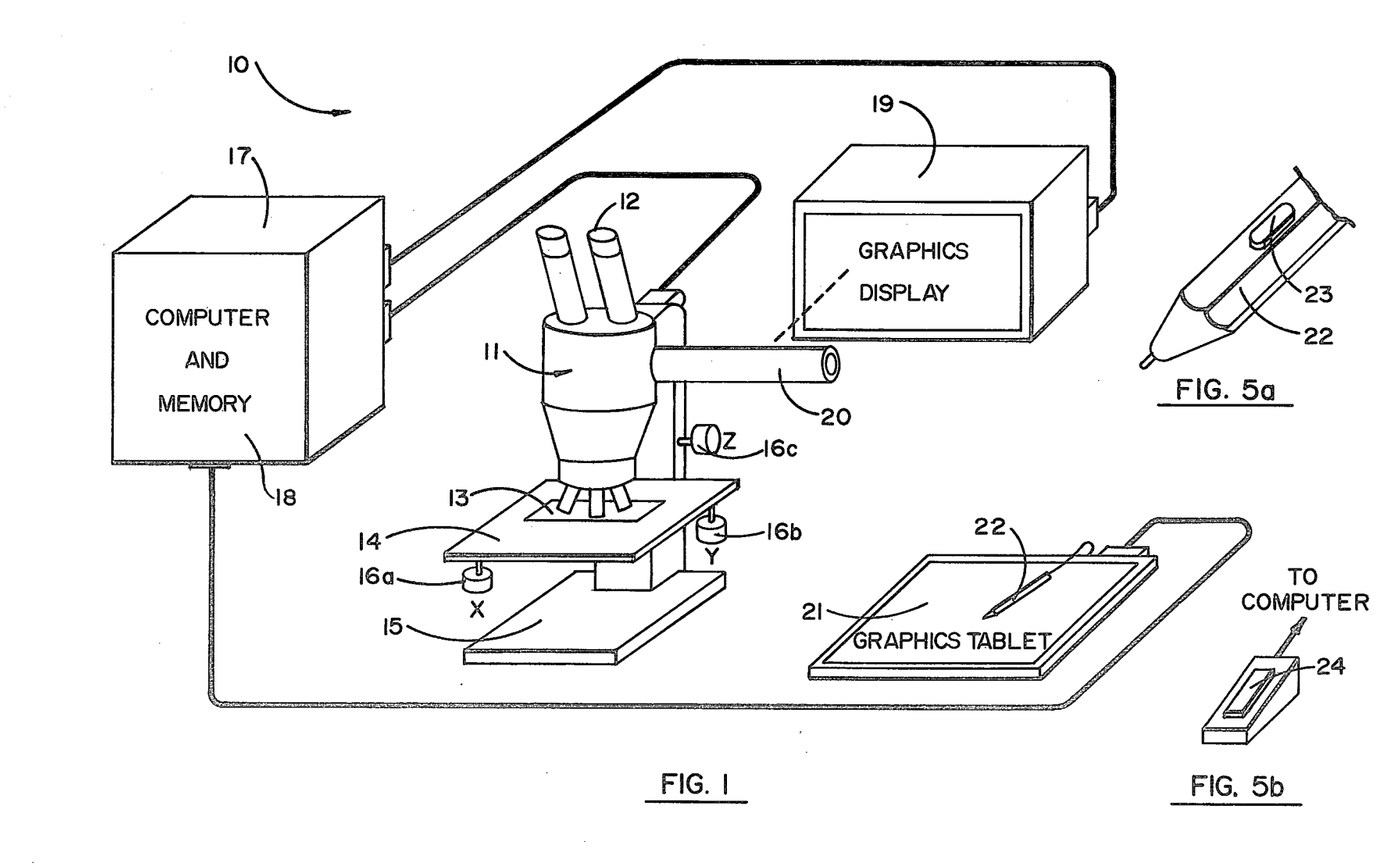
FIG. 1 is a schematic pictorial representation of the overall apparatus of one embodiment of the present invention.
FIGS. 5a and 5b, respectively, illustrate two means for manually and selectively entering data into the computer: one, a switch on a hand-held stylus associated with a graphicstablet, interfaced with the computer; and two, a foot switch interfaced to the computer.
Figures 2, 3:
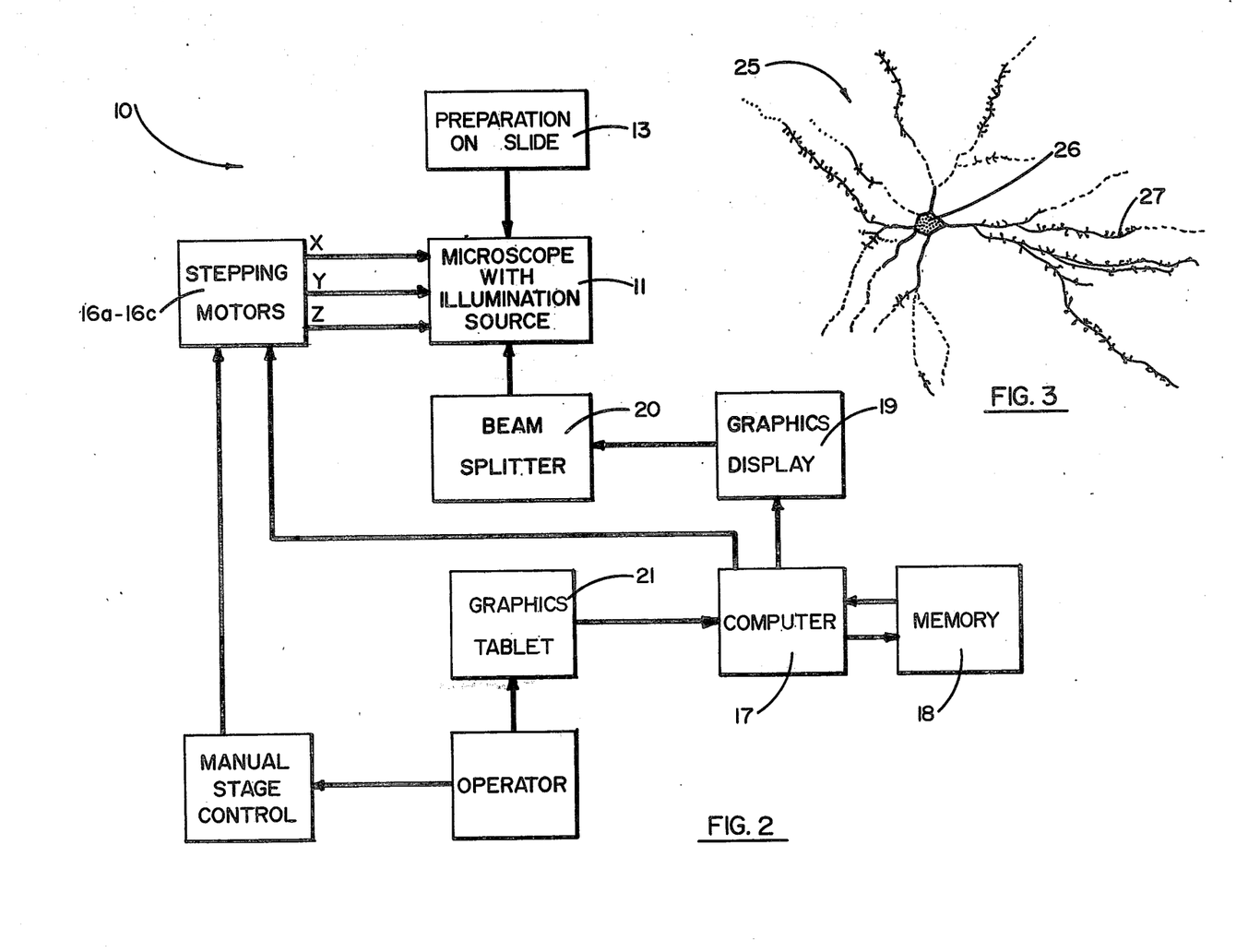
FIG. 2 is a schematic block diagram corresponding to the overall apparatus shown pictorially in FIG. 1.
FIG. 3 illustrates a typical brain cell or neuron, as viewed in the microscope, which may be examined and analyzed by means of the present invention.

With reference to FIGS. 1 and 2, there is illustrated one embodiment of the present invention. It will be appreciated by those skilled in the art that these figures are schematic illustrations, first, for purposes of convenience, and second, to crystallize the essence of the present invention. With this in mind, the computer microscope system 10 of the present invention includes an optical microscope 11 having conventional oculars 12, a slide 13 containing a preparation (or object) to be examined, a stage 14, a base 15, and respective stepping motors 16a, 16b and 16c for controlling the microscope in X-Y-Z axes, respectively. While an X-Y-Z Cartesian coordinate system is disclosed, nevertheless, the present invention is equally applicable to a polar coordinate axis system, as well as other types of light microscopes and illumination systems.

A programmable digital computer 17, which has a memory 18 for storing data, is connected to a graphics display 19. The graphics display electronically produces an image which includes, first, selected data from the computer memory, and second, system "commands". These commands comprise a set of programmed procedures and instructions available to the operator for controlling the computer microscope in a manner hereinafter described.

A camera lucida or optical beam splitter 20 (which is sometimes referred to as a "drawing tube") is incorporated in the microscope. The beam splitter is physically juxtaposed to, and optically aligned with, the graphics display. With this arrangement, the electronically-produced image of the graphics display is pictorially superimposed upon the image of the preparation; and this pictorial superposition of images, directly in the microscope's field of view, is an important feature of the present invention.

A graphics tablet 21 is interfaced with the computer. The graphics tablet may be positioned to the right of the microscope, to the left of the microscope, or in any convenient location. The graphics tablet is equipped with a handheld stylus 22. The position of the tip of the stylus 22 (see FIG. 4a) is represented by a "blinking X" 39 (or other easily distinguished symbol) visible to the operator in the graphics display 19. By manipulating the stylus and activating its switch 23 (shown in FIG. 5a)—or alternatively manipulating the stylus and activating a foot switch 24 (shown in FIG. 5b)—the operator may selectively enter data into the computer's memory, retrieve data, investigate other areas of the slide, and otherwise exert complete control over the microscope and the computer.

This combination of pictorial image superposition directly in the microscope's field of view, and the manually-manipulatable means (such as the graphics tablet and stylus) for facilitating operator control and total intervention with the examination process, is an important contribution of the present invention. As a result, the operator has complete flexibility and control over the computer microscope system—while continuing to look into the microscope—and there is no requirement for a diversion of the operator's eyes away microscope's field of view.

With reference to FIG. 3, there is illustrated a typical neuron 25 having a cell body 26 and a set of dendrites 27. This neuron is only one example of the cell structures or other objects that may be examined and analyzed by means of the computer microscope of the present invention. This computer microscope, as previously indicated, will likely be operated by a researcher engaged in a variety of scientific disciplines, such as cytology or histology.

Figure 4A:
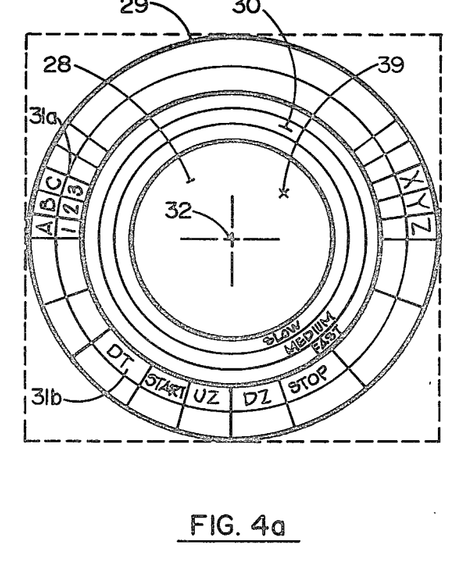
FIG. 4a illustrates an electronically-produced image in the microscope's field of view, showing the system-control area with a set of programmed procedures and instructions available to the operator, but without showing the image of a preparation mounted on a slide in the microscope's stage.

With reference to FIG. 4a, there is illustrated a preferred embodiment of the system "commands" which are electronically produced by the graphics display 19, and which are visible to the operator directly in the microscope's field of view. In FIG. 4a, for convenience of illustration, there is no slide on the microscope stage, and no optical feedback, i.e., retrieval of stored data from the computer memory. Moreover, it will be appreciated by those skilled in the art that the particular format of the system commands illustrated therein is only exemplary of the present invention, and that a variety of formats may be equally applicable.

Figure 4B:
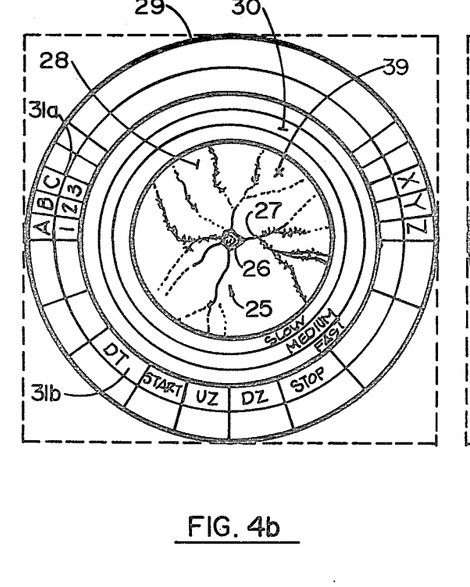
FIG. 4b corresponds to FIG. 4a, but additionally illustrates the image of a preparation on a slide in the microscope's stage, the preparation corresponding substantially to the brain cell of FIG. 3.
Figure 4C:
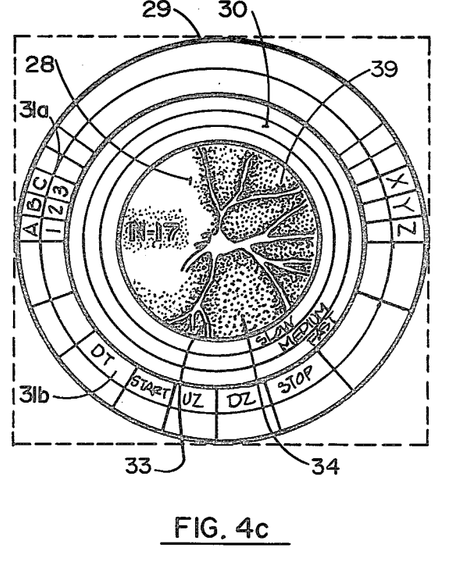
FIG. 4c corresponds to FIG. 4b, but additionally illustrates the optical feedback of an electronically-produced image of data retrieved from the computer memory, the image constituting light lines, and the stippled area representing the dark background, it being understood that in usage the images of FIGS. 4b and 4c will be superimposed upon one another.

With this in mind, the display comprises two general areas: first, a central circular image area 28 (shown blank in FIG. 4a) and two, an annular system-control area (denoted generally as at 29) which remains constant despite pictorial changes in the image area 28. This system-control area 29 concentrically surrounds the circular image area 28, and includes two annular bands 30 and 31. The inner band 30 comprises a "move" or manipulation area for controlling the horizontal movement of the microscope stage via the computer. The outer band 31 is segmented diametrically and includes a keyboard area 31a and a command area 31b. The keyboard area 31a is segmented to include the desired alphanumerics (A, B, C . . . and 1, 2, 3 . . . ) while the command area 31b is segmented to include the desired specific commands for data entry and retrieval. As appreciated by those skilled in the art, the alphanumerics and the commands are established in conjunction with the desired "software" used to program the computer. Examples of specific commands that may be chosen, as illustrated in FIGS. 4a–4c, are as follows: "START", "STOP", "DT" (for dendrite terminus), "UZ" (for up stage, along the Z axis), and "DZ" (for down stage).

One example of exercising system control is as follows: The operator may touch the tip of the stylus 22 to a particular region of the manipulation area 30, activate the stylus by means of its switch 23, and hence instruct the computer to automatically move the stage 14 into the desired region of the slide 13. In this manner, the desired particular region may be brought rapidly to (or near to) the optical axis 32 of the microscope—there is no requirement for bringing the particular point or region to be investigated exactly to the optical axis—and this is another important feature of the present invention.

With reference to FIG. 4b, the neuron 25 (of FIG. 3) is contained on the slide, and is illustrated in its relationship to the display of the system commands previously described. With further reference to FIG. 4c, the operator has exercised the necessary commands to retrieve selected data from the computer memory. The retrieved data constitutes optical feedback available to the operator (along with the system commands) directly in the microscope's field of view. This retrieved data is presented to the operator as luminous lines 33 against a dark background 34, the latter being illustrated by the stipled lines in FIG. 4c.

Moreover, it will be appreciated by those skilled in the art that the images of FIGS. 4b and 4c are superimposed upon one another directly in the microscope's field of view. This superposition of the two images, one the visual image of the preparation on the slide, and the other an electronically-produced visual image of the system commands and the data retrieved from the computer memory, is a major contribution of the present invention and provides a number of important advantages.

First, the present data (or object) may be compared against the historical data, and this provides an immediate verification of the data-acquisition mode of operation, or in other words, that the operator has acquired the data correctly. Second, the operator may do a "serial section analysis"; that is, prior to investigating selected cells individually, the operator can reassemble in proper order and alignment the structural components contained in successive slides. Third, the operator may place the computer in the "line drawing mode", such that the computer will draw a line (or vector) between two successively-designated points. In this mode, the operator may touch the tip of the stylus to identify one point in the preparation, activate the stylus by pressing the stylus switch 23 or the foot switch 24, lift up the stylus, touch a second point, and again activate the stylus; the computer will then draw and display a luminous vector between the two points. This is useful, for example, in chordal approximations of dendrites.

In addition, the operator may want to locate a large number of cell bodies before investigating selected cells individually. Thus, the operator may obtain a pictorial appreciation of the entire slide, prior to performing a detailed analysis of the various sections. Focus may be readily changed, the original data may be readily recalled, and the particular region to be investigated may be brought to the optical axis.

Figure 6:
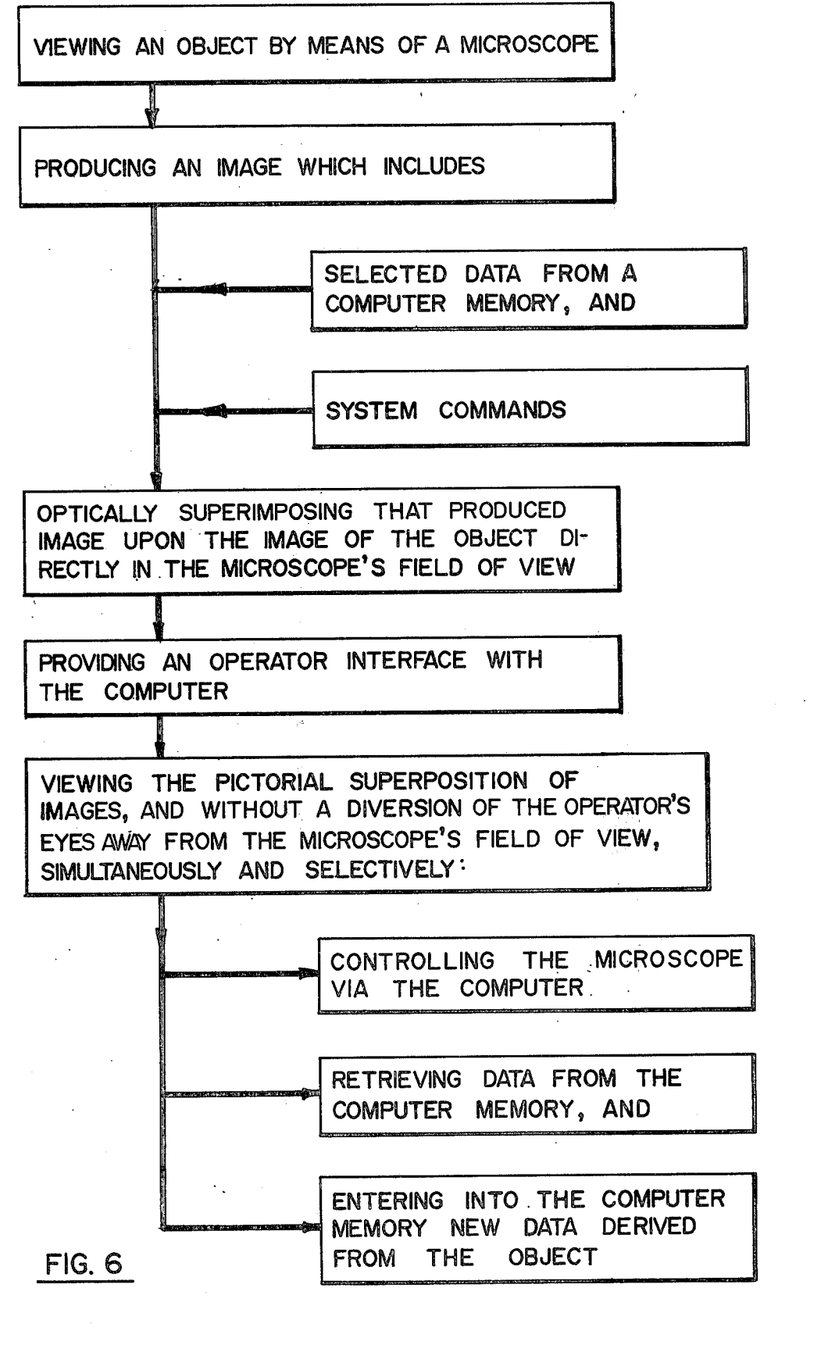
FIG. 6 is a block diagram illustrating schematically the sequence of steps comprising the method of the present invention.

The inventive method of the present disclosure is outlined and crystallized by the sequence of steps illustrated in block-diagram form in FIG. 6.

Figure 7:
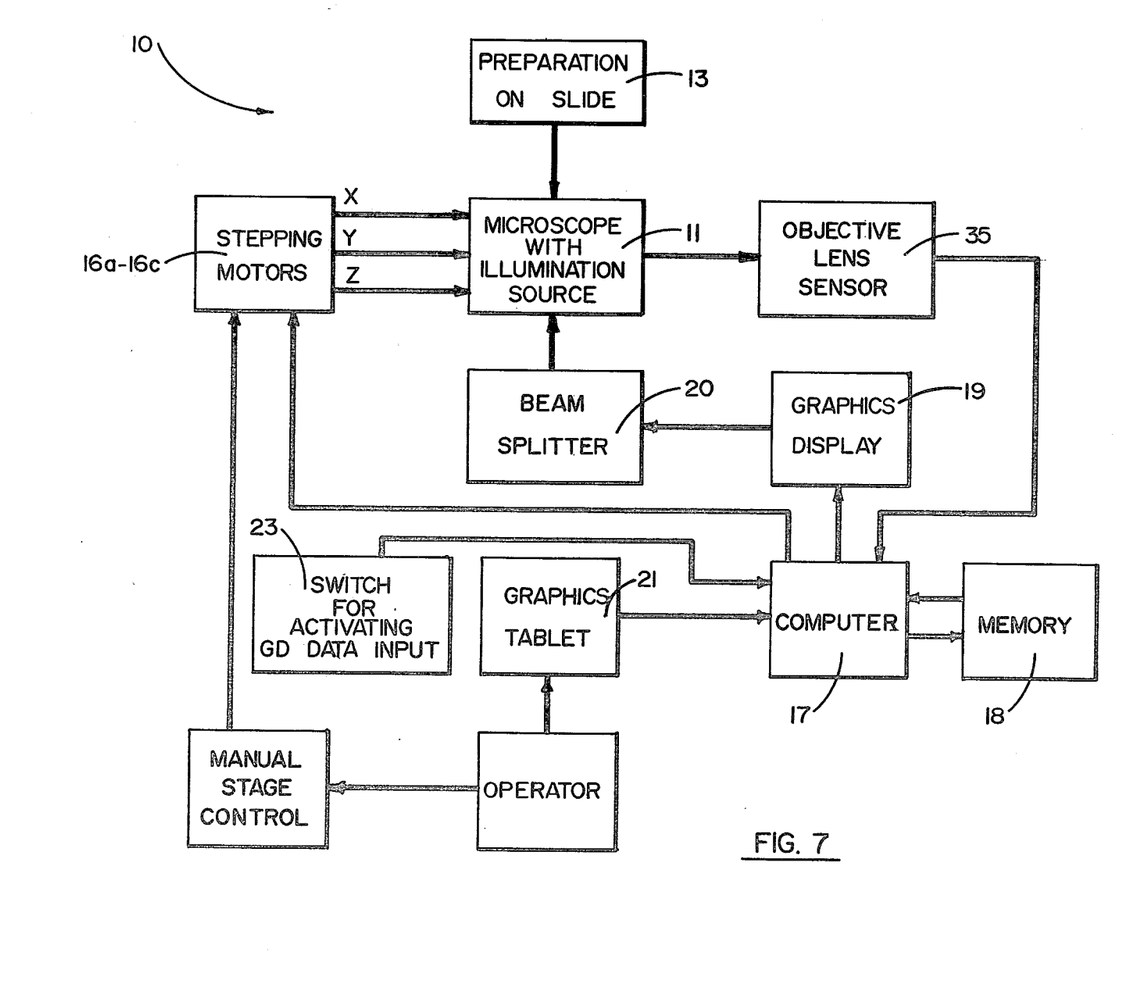
FIG. 7 is similar to FIG. 2, but illustrates a first modified embodiment of the present invention.

With reference to FIG. 7, which corresponds substantially to the block diagram of FIG. 2, there is illustrated an objective lens sensor 35 connected between the microscope 11 and the computer 17. The purpose of the sensor 35 is to maintain a constant magnification ratio between the microscope 11 and the graphics display 19, thereby facilitating a continuous pictorial image superposition directly in the field of view of the microscope. Also illustrated in block diagram form in FIG. 7 is the switch 23 on the stylus (or the foot switch 24) interfaced with the computer 17 for executing the commands of the operator. In lieu of the graphics tablet 21 and stylus 22, it will be appreciated by those skilled in the art that if only a review of historical data is desired, that a conventional light pen (not shown) could be manipulated by the operator directly on the graphics display 19; however, the graphics tablet and stylus arrangement is more convenient to use in the preferred embodiment.

The individual components of the overall system of the computer microscope of the present invention are readily available. For example, the major components are as follows:

1. Universal Research Microscope, Carl Zeiss, Catalog No. 47-46-05, furnished with stepping-motor stage control, camera lucida, and transmitted light illumination.

2. Electrical sensor attached to microscope stage.

3. Graphics Tablet, with Graf Pen, Science Accessories Corp., Southport, Conn.

4. Digital Computer, Digital Equipment Corp., Maynard, Mass., Type PDP-11, including central processor with 32k words of core memory, disk and magnetic tape storage, with Graphics Display, VT-11.

Figure 8:
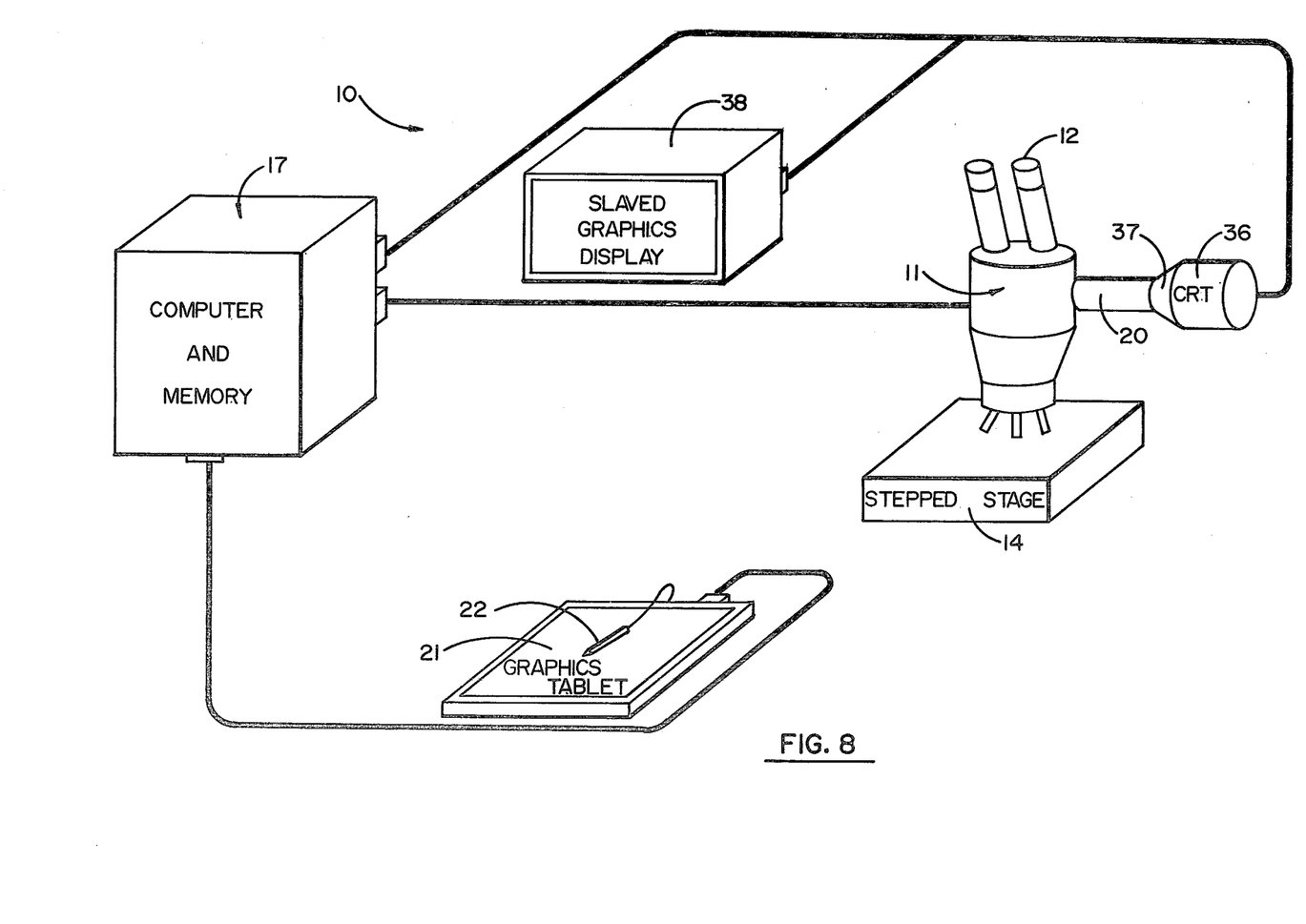
FIG. 8 is similar to FIG. 1, but illustrates a second modified embodiment of the present invention.

With reference to FIG. 8, there is illustrated an alternate embodiment of the present invention. In FIG. 8, the graphics display comprises a relatively small-diameter cathode ray tube ("CRT") 36 in substantial end-to-end abutting relationship with the beam splitter 20. An adapting lens 37 (or other suitable optical transition) is disposed between the CRT 36 and the beam splitter. Once the CRT is properly aligned with the beam splitter, the microscope may be moved without substantially disturbing the alignment. Thus, this apparatus is relatively portable and compact, and may be easily moved about and readily adjusted to the experimental conditions at hand. As a result, this apparatus may be used by surgeons in performing very delicate operations, in which case the microscope 11 will be a so-called operating or dissecting microscope. Using the dissecting microscope, the apparatus of FIG. 8 could also possibly be used by an ophthalmologist. Delicate structures in a patient's eye, such as the retina, may be observed and stored in a computer for recall, and then compared with earlier or later observations. This may be important in studying the course of a disease. Moreover, for instructional purposes in the laboratory or operating room, a slaved graphics display 38 may be added to the system of FIG. 8, in parallel with the CRT 36.

The computer microscope of the present invention is primarily intended for transmitted light illumination. However, the present invention is equally applicable to dark field illumination, polarized light illumination, phase contrast illumination, or reflected light illumination. Reflected light illumination is required for most metallurgical analyses and for the examination of electronic circuits, such as integrated circuits.

Moreover, in lieu of a monochromatic display system, the graphics display may comprise a color display in order to differentiate between different types of data, or between the data and the instructions or commands available to the operator, or to preserve the chromatic properties of the original image.

OPERATION

The primary peripheral input to the computer 17 is the graphics tablet 21 with its stylus 22. As previously noted, the physical location of the graphics tablet 21 with respect to the microscope 11 is arbitrary, and the graphics tablet 21 may be positioned in any location convenient to the operator. The entire active surface of the graphics tablet 21 is electronically superimposed on the graphics display 19 by means of the computer 17. The position of the tip of the stylus 22 on the active surface of the graphics tablet 21 is reproduced on the graphics display by a suitable symbol, such as a "blinking X" 39 shown in FIGS. 4a–4c. The operator moves this blinking X by moving the stylus 22 so that the X overlies any point on the image of the preparation within the imaging or pictorial area 28. By using the stylus in this manner, the operator can mark points and features of interest in the preparation that are to be stored in the computer's memory. This information is immediately visualized on the graphics display 19 and superimposed on the image of the preparation. This information feedback permits the operator to inspect previously stored data, and if desired, to edit or change that data during observation.

The system controls are also available to the operator directly in the microscope's field of view. The alphanumerically-encoded subdivided regions of the keyboard area 31a function in a manner similar to a conventional computer-input typewriter keyboard. The command area 31b allows the operator to issue often-used and well-defined commands. These system controls allow the operator to enter pertinent alphanumeric data and to issue commands calling for different data-analysis programs. As with the pictorial area 28, the keyboard area 31a and command area 31b are both accessible to the operator by means of the position of the stylus 22 on the graphics tablet 21.

Moreover, when the operator brings the stylus 22 to some point in the annular "move" area 30, this is sensed by the computer 17; and the computer causes the stepping motors 16a–16b to move the stage 14 in the diametrically-opposite direction. The point in the graphics display 19 is thus brought as close to the optical axis 22 as the "step" size of the stepping motors will permit. In this manner, any region of the preparation can be brought quickly into the field of view at any magnification. The graphics display 19 is electronically "locked" to the microscope's stage 14. Whenever the stepping motors are activated to move the stage 14, the pictorial component or image of the graphics display 19 is simultaneously translated an equivalent distance; and the image of the graphics display 19 and the image of the preparation are thus maintained in perfect registration. As shown in FIGS. 4a–4c, the "move" area 30 preferably is subdivided into three annuli providing for "Slow", "Medium" and "Fast" movement of the stage-plus-display.

The operator may control the data analysis and acquisition while looking through the microscope's oculars 12. Within the microscope's field of view, the operator sees an electronically-produced optically-superimposed image on the image of the preparation. This electronically-produced image includes the system controls comprising the move area 30, keyboard area 31a, and command area 31b. (To that limited extent, and in a nonanalogous art, the computer microscope of the present invention remotely resembles a conventional single lens reflex camera having its settings presented directly within the field of view.) Moreover, the system control area 29 does not impinge upon the pictorial area 28, and hence there is no degradation of the optical quality of the image in the pictorial area 28. Also, since the conventional graphics tablet 21 has a rectangular format, the four corners of the graphics tablet 21 (beyond the annular system-control area 29) are not visible in the microscope's field of view, and may be utilized for other command functions which are not directly related to image observation.

OPTICAL CONSIDERATIONS

The precision of position measurement is determined by the resolution of the microscope optics and the resolution of the combination of the graphics display 19 and graphics tablet 21. (It is, of course, the resolution of well-corrected microscope objectives that limits the maximally attainable system resolution). Table 1 (below) shows the approximate horizontal resolution, and the field size for various well designed objectives used with bright field illumination. Also shown is the ratio of field diameter to horizontal resolution. This is the number of resolvable points along one horizontal axis of the field. It corresponds to the number of resolvable points the combination of the graphics display 19 and graphics tablet 21 must have in order not to degrade the resolution of the entire system.

Table 1

| Objective Magnification | Resolution (micra) | Field Size (micra) (in combination with 10 × eyepiece) | Linearly Resolvable points |
|---|---|---|---|
| 6 | 1.5 | 3000 | 2000 |
| 12 | 1.0 | 1500 | 1500 |
| 40 | 0.3 | 450 | 1500 |
| 100 (Oil Immersion) | 0.2 | 200 | 1000 |

Table 1 indicates that a graphics display/graphics tablet combination providing 2,048 linearly resolvable points (an 11-bit binary number) will be properly matched to the microscope's optimum optics in the most demanding case, a 6× achromat objective. Furthermore, with a graphics display-graphics tablet combination having 2,048 resolvable points, it is possible with a 100× oil-immersion objective to measure the horizonatl coordinates of any point in the preparation to a precision of 0.2 microns. Linear resolution in the graphics system finer than 2,048 points is not necessary. For a preparation whose horizontal dimensions are 13.1×13.1 mm, the use of a 16-bit word for each coordinate will permit specifying position in units of 0.2 micron. Lowering the precision of measurement to 1 micron, a decrease of resolution by a factor of 5, means that with the same word size the usable field will increase in proportion, i.e., to 65.5×65.5 mm.

ADVANTAGES

In summary, and as will be appreciated by those skilled in the art, the computer microscope of the present invention provides a number of important technical advantages, which may be summarized and outlined as follows:

1. The presence of the system commands directly in the visual field of the microscope, and the ability of the operator to transmit these commands without having his attention diverted from the visual field, permits rapid and flexible control of the data acquisition process.

2. Superposition of the graphically displayed data on the image of the object provides the operator with the opportunity to verify the validity of the data received by the computer, not merely the input data represented by the stylus position on the graphics tablet. The superposition also permits minimization of position errors by direct comparison of input and output, and again, there is no requirement for the operator to divert his attention away from the visual field containing the object under study.

3. Superposition in the original microscope image field avoids several optical disadvantages, as follows:
  (a) Superposition on a projection screen requires high intensity illumination of the object, especially when high magnifications are employed. A high level of illumination can be detrimental, if not destructive, to the object because of bleaching. There is also the loss of fluorescence when objects are stained with fluorescent dyes whose rate of degradation depends upon the level of illumination.
  (b) There is a loss of resolution incurred with image superposition techniques that involve either projection screen images or video raster scanned images of the object. Their resolution is measurably less than that attained in direct examination of the original virtual image. The superposition of a virtual image of a graphics display upon that image does not degrade the resolution.
  (c) It is possible to study the color properties of the object with greater ease. Projection images, because of their low light levels, do not present as good color rendition to the observer as does the original virtual image. Color reproducing video scan devices are based upon three-color image reproduction techniques. They destroy true spectral information and have even less visual resolution than monochrome scanning systems.

4. Use of the graphics tablet control system facilitates the control of other forms of object illumination such as flying-spot illumination by transmitted or reflected light. It also facilitates the use of accessory image analysis instruments (such as microspectrophotometers) and permits them to be incorporated easily into a comprehensive image analysis system.

5. Coupling of visual magnification factors into the graphics display makes it possible to maintain image superposition regardless of image magnification. All positional data are represented in a single frame of reference. This means that the microscope can be directed to bring any point in the object to the optical axis regardless of the magnification employed.

UTILITY AND ADDITIONAL APPLICATIONS

The computer microscope of the present invention, in its preferred embodiment, is intended primarily for the neuroanatomical purpose of mapping cell locations and tracing dendritic and axonal trees. To the researcher in this science, the technical advantages and unique features of this computer microscope (as outlined above) are indeed important. They are equally important, however, in a wide variety of research studies in other disciplines, some examples of which may be briefly outlined as follows:

1. In stereology, by use of the graphics display, various patterns of lines, curves, etc. can be superimposed upon the image of the microscopic preparation. This will permit such measurements as the number of objects within a bounded region, the number of intersections of various structures with a particular contour, etc. Stereology can be extended easily to three dimensions by coupling the display generator to the Z-axis position of the microscope. Thus, reference surfaces such as spheres could easily be presented to the observer.

2. In particle counting, large numbers of particles in thick preparations can be counted accurately with the aid of immediate visual feedback to ensure that no particle has been missed or counted twice.

3. In tracking temporal changes in tissue culture preparations, slow changes (minute to minute) in cell shape and position can be monitored in all three dimensions. (More rapid changes might also be dealt with if automatic tracking and focussing mechanisms are incorporated into the system).

4. In serial section alignment one can superimpose the contours of a previously studied section upon the present section for study of structures that continue from one section to the next.

5. The same material may be examined under different conditions of illumination and magnification, since the graphic display will permit the investigator to view and compare simultaneously the data acquired under these different conditions.

6. The analysis of three-dimensional structures and objects is facilitated, especially in thick sections, by altering the focus and tracing the in-focus contour. Topographical outline drawings can be quickly prepared, viewed and compared with the original object immediately. This may be of particular importance in dealing with living, growing tissue.

Moreover, a variety of other applications may be found outside the field of biology. One such example is the accurate tracing of nuclear particle tracks in particle disintegration experiments.

Obviously, many modifications may be made without departing from the basic spirit of the present invention. For example, in lieu of the graphics display 19, images from other types of displays may be optically superimposed in the microscope's field of view. One is a television-type of raster display stored on video tape. Another is a projected display of photographic images selected by computer control. As another example, the tip of the stylus may have a pressure-sensitive switch activated upon a physical depression of the stylus upon the graphics tablet. Accordingly, it will be appreciated that within the scope of appended claims, the invention may be practiced other than has been specifically described therein.

We claim:
1. A computer microscope, comprising
computer means including memory means for storing data,
graphics display means connected to the computer means for electronically producing an image which includes
selected data from the computer memory means, and
a set of programmed procedures and instructions available to the operator,
microscope means for viewing a preparation therein and including optical beam splitter means juxtaposed to the graphics display means and optically aligned therewith,
thereby providing a pictorial superposition of the electronically-produced image of the graphics display means upon the image of the preparation in the microscope means, and
manually-manipulatable means interfaced with the computer means and selectively activated by the operator while continuing to view the pictorial superposition in the microscope means,
whereby the operator may control the microscope means via the computer means, and whereby the operator may selectively enter into the computer memory means additional data derived from the preparation, without requiring a diversion of the operator's eyes away from the field of view in the microscope means.

2. The computer microscope of claim 1, wherein the manually-manipulatable means interfaced with the computer means comprises
a graphics tablet having a hand-held stylus.

3. The computer microscope of claim 2, wherein the stylus is provided with a switch selectively activated by the operator.

4. The computer microscope of claim 2, further including
a foot switch interfaced with the computer and selectively activated by the operator.

5. The computer microscope of claim 1, wherein the manually-manipulatable means interfaced with the computer means comprises
a hand-held light pen associated with the graphics display means.

6. The computer microscope of claim 1, wherein the microscope means has a stage which is servo controlled by the computer means in any desired coordinate system.

7. The computer microscope of claim 6, wherein the stage is controlled in an X-Y-Z Cartesian coordinate system.

8. The computer microscope of claim 6, wherein the stage is controlled in a polar coordinate axis system.

9. The computer microscope of claim 1, further including
sensor means connected between the microscope means and the computer means,
whereby a constant magnification ratio is maintained for facilitating a continuous pictorial super-position of the electronically-produced image of the graphics display means upon the image of the preparation in the microscope means.

10. The computer microscope of claim 1, wherein the electronically produced image of the graphics display means, which is superimposed upon the image of the preparation, comprises
a central circular imaging area, wherein the image of the selected data is presented, and
an annular system-control area, concentrically surrounding the central area, and remaining constant despite changes in the images presented in the central area.

11. The computer microscope of claim 10, wherein the system-control area comprises
a manipulation area for controlling the movement of the microscope via the computer,
a keyboard area including an alphanumeric display, and
a command area for data entry and retrieval.

12. The computer microscope of claim 10, wherein the imaging area and the system-control area are displayed in contrasting colors.

13. The computer microscope of claim 1, wherein the graphics display means is disposed in abutting relationship with the beam splitter means.

14. The computer microscope of claim 13, wherein the graphics display means comprises
a small diameter cathode ray tube.

15. The computer microscope of claim 14, wherein an adapting lens is disposed between the cathode ray tube and the beam splitter means.

16. The computer microscope of claim 13, further including
a slaved graphics display connected to the computer means in parallel with the graphics display means.

17. The computer microscope of claim 13, wherein the microscope means comprises a dissecting microscope.

18. A computer microscope, comprising
microscope means for viewing a preparation on a stage therein,
computer means including a memory means for storing data,
graphics display means connected to the computer means for electronically producing an image which includes selected data from the computer memory means, and a set of programmed procedures and instructions available to the operator, optical beam splitter means incorporated in the microscope means and physically juxtaposed to the graphics display means and optically aligned therewith, thereby providing a pictorial superposition of the electronically-produced image of the graphics display means upon the image of the preparation in the microscope means, means for controlling the stage of the microscope means, via the computer means, in a reference coordinate system, sensor means connected between the microscope means and the computer means, whereby a constant magnification ratio is maintained for facilitating a continuous pictorial superposition of the electronically-produced image of the graphics display means upon the image of the preparation, and graphics tablet means interfaced with the computer means and including a hand-held stylus selectively activated by the operator while continuing to view the pictorial superposition in the microscope means, whereby the operator may control the microscope means via the computer means, and whereby the operator may selectively enter into the computer memory means additional data derived from the preparation, without requiring a diversion of the operator's eyes away from the field of view in the microscope means.

19. In a computer microscope, the combination of computer means including memory means for storing data, microscope means including ocular means for viewing an object, means connected between the computer means and the microscope means for simultaneously superimposing upon the object's image a pictorial image of selected data from the memory means together with system commands, and further means selectively activated by the operator, while continuing to view the superimposed pictorial image, for controlling the microscope means via the computer means, retrieving other data from the memory means, or entering new data derived from the object into the memory means, whereby the operator has control and flexibility and the facility for total intervention, without requiring a diversion of the operator's eyes away from the ocular means.

20. The method of making a computerized microscopic analysis which comprises the steps of providing a microscope for viewing an object therein, providing a computer having a memory, producing an image which includes selected data from the computer memory, and system commands, optically superimposing said last-named produced image upon the image of the object visible in the microscope's field of view, providing an operator interface with the computer viewing the pictorial superposition of images, and without a diversion of the operator's eyes away from the microscope's field of view, simultaneously and selectively controlling the microscope via the computer, retrieving data from the computer memory, and entering into the computer memory new data derived from the object.

21. The method of claim 20, further including the step of taking a measurement by bringing the stylus to the particular point to be examined, thereby avoiding any requirement for the particular point to be brought exactly to the optical axis.

22. The method of claim 20, further including the steps of providing a graphics tablet having a stylus, and viewing the location of the tip of the stylus with respect to the object, while automatically maintaining superposition.

23. In a computerized microscope, a superimposed pictorial display viewed by the operator directly in the microscope, said superimposed pictorial display comprising a first area for presenting a visual image of an object in the microscope in its superimposed relationship to an electronically-produced image of data retrieved from the computer's memory, and a second area for providing system control, said second system-control area remaining constant despite pictorial changes in the first area.

24. The superimposed pictorial display of claim 23, wherein said first area comprises a central circular area, and wherein said second system-control area comprises an annular area concentrically surrounding the central area.

25. The superimposed pictorial display of claim 24, wherein said annular system-control area comprises a manipulation area for controlling the movement of the microscope via the computer, a keyboard area including alphanumerics, and a command area including specific commands for data entry and retrieval.

26. The superimposed pictorial display of claim 25, wherein said manipulation area comprises a first annular band radially of the central circular area, and said keyboard area and said command area are formed in a second annular band radially of said first annular band, said second annular band being segmented diametrically.

27. In a computerized microscope, a superimposed pictorial display viewed by the operator directly in the microscope, said superimposed pictorial display comprising a first area for presenting a visual image of an object in the microscope in its superimposed relationship to an electronically-produced image of data retrieved from the computer's memory, and a second area, adjacent to the first area and remaining constant despite pictorial changes therein, and including a manipulation area for controlling the movement of the microscope via the computer, and at least one command area for data entry and retrieval.

28. The superimposed pictorial display of claim 27, further including, in combination, a graphics tablet having a hand-held stylus, selectively interfaced with the computer, and adapted to be activated by the operator.

29. The superimposed pictorial display of claim 27, further including, in combination,
a graphics display interfaced with the computer, and
a hand-held light pen, associated with the graphics display, and adapted to be activated by the operator.

* * * * *